April 1, 1924. 1,488,700
A. W. NELSON
HOLDING DEVICE FOR HOLDING A NUMBER OF NESTED CUPS, DISHES, AND
THE LIKE TOGETHER
Filed Aug. 8, 1922
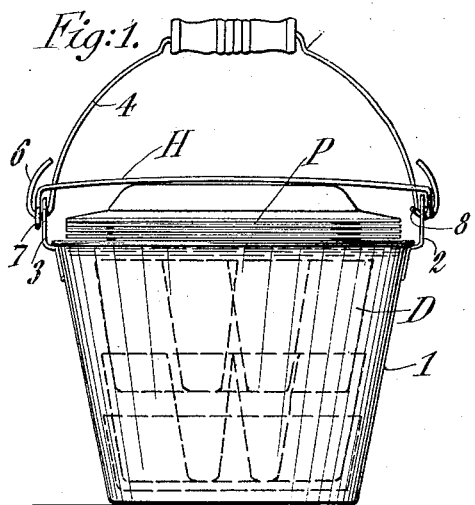
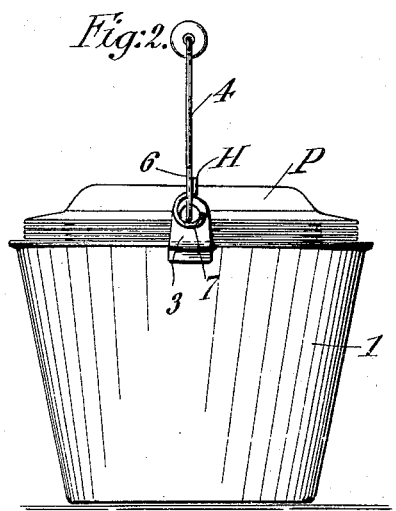
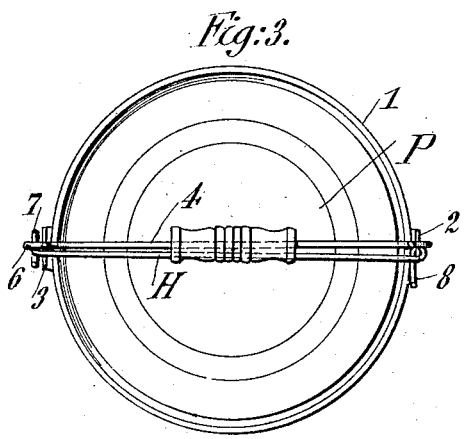
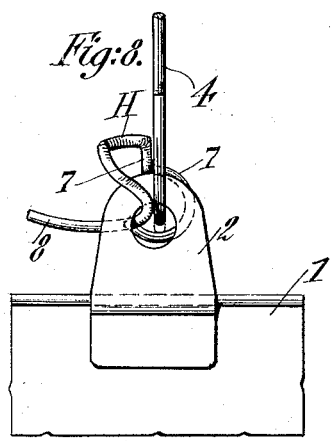
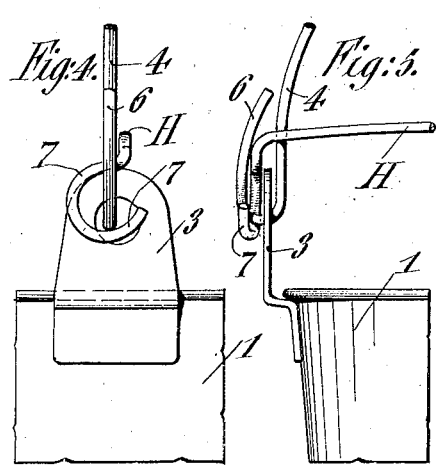
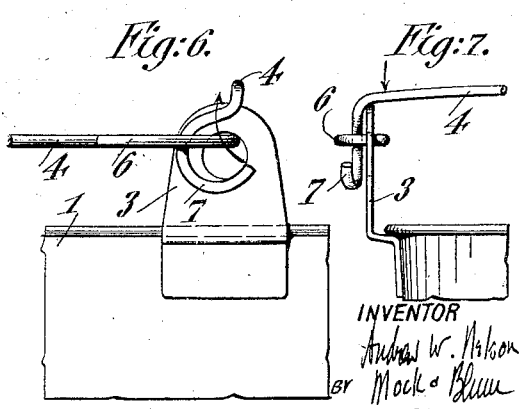
INVENTOR
Andrew W. Nelson
BY Mock & Blum
ATTORNEYS Patented Apr. 1, 1924.

1,488,700

UNITED STATES PATENT OFFICE.

ANDREW W. NELSON, OF TERRE HAUTE, INDIANA, ASSIGNOR TO COLUMBIAN ENAMELING & STAMPING COMPANY, OF TERRE HAUTE, INDIANA, A CORPORATION OF INDIANA.

HOLDING DEVICE FOR HOLDING A NUMBER OF NESTED CUPS, DISHES, AND THE LIKE TOGETHER.

Application filed August 3, 1922. Serial No. 580,391.

*To all whom it may concern:*

Be it known that I, ANDREW W. NELSON, a citizen of the United States, residing at 1735 Garfield Ave., Terre Haute, in the county of Vigo and State of Indiana, have invented certain new and useful Improvements in a Holding Device for Holding a Number of Nested Cups, Dishes, and the like Together, of which the following is a specification.

My invention relates to a new and improved holding device for holding a number of nested cups, dishes and the like together.

One of the objects of my invention is to provide a holding device whereby a number of cooking utensils, eating utensils and the like are firmly, but releasably held together in a nested condition so that they can be easily stored and transported.

Another object of my invention is to provide a holding device of the character before specified which shall be particularly convenient for automobilists who desire to transport a large number of cooking and eating utensils in a relatively small space.

Another object of my invention is to provide a device of the character before specified in combination with a pail in which the other utensils are located.

Another object of my invention is to provide a device of the character before specified in combination with a pail having a handle, so that the holding device cannot be released while the said handle is in the vertical position, that is, while the nested utensils are being carried.

Other objects of my invention will be set forth in the following description and drawings which show a preferred embodiment thereof.

Fig. 1 is a front elevation showing the handle of the pail or the like in vertical position.

Fig. 2 is an end view taken at the right hand side of Fig. 1.

Fig. 3 is a top view of Fig. 1.

Fig. 4 is a detail view showing how one end of the hook engages with one end of the handle, this view being a side elevation.

Fig. 5 is a front elevation of the parts shown in Fig. 4 and in the same position.

Fig. 6 is a detail view showing how one end of the hook is forced into position, the parts being shown in side elevation.

Fig. 7 is a front elevation of Fig. 6.

Fig. 8 is a detail side view.

A pail 1 which can be made of enameled ware or any other suitable material, is provided with lugs 2 and 3. The pail 1 is adapted to have a series of utensils D nested therein as shown in Fig. 1 and a number of plates P are arranged on top of the utensils located within the pail 1 so that some of the plates project above the top of the pail 1. The articles before mentioned have a certain resilience so that after the utensils have been placed into the position shown in Fig. 1, the plates P can be forced downwardly to a certain extent.

The pail is provided with an ordinary handle 4 having bent end portions 6 of the contour shown in Fig. 1.

In order to keep the nested utensils firmly in position, a hook H is provided which is adapted to engage with the lugs 2 and 3. The hook H, like the handle 4, is preferably made of a metal having a certain resiliency and as before mentioned, pail 1, including the lugs thereof, is also made of material having a certain amount of resilience. One end of the hook H, this being the right hand end 8 shown in Fig. 1 and also in Fig. 8, has a substantially U-shaped contour so that when the hook is in operative position the bottom lug of the hook of the end 8 is substantially horizontal. The other end 7 of the hook has a substantially circular contour as clearly shown in Fig. 2 for example. This hook is secured in position as follows:

The handle 4 is preferably placed into the horizontal position and then the end 8 can be readily inserted into the lug 2, into the position shown in Fig. 8 for example as the hole in the lug 2 is made large enough for this purpose. The hook can now be moved until the arcuate end thereof is in the position shown in Figs. 4 and 6. When the hook is released the resiliency of the utensils causes said hook to move upwardly into the position shown in Fig. 2 in which it firmly engages the ends 6 of the handle 4. This causes the utensils to be firmly held within the pail 1. The handle can now be turned into the upright position and when this is done one end 6 of the handle 4 acts like a cam because of the relative contours of the parts so as to contact with and depress the arcuate end 7 of the hook and forces it into the position shown in Fig. 4. This causes the utensils D to be firmly pressed together so that they can be transported without any substantial rattling or the like and this is very important because it saves the dishes from being injured or chipped if they are made of enameled ware.

While the handle is in the upright position it is impossible to disengage the other end of the hook H therefrom because the ends thereof are so shaped that they interlock in this position, as clearly shown in the drawings. Hence any displacements of the parts is prevented while the article is being carried.

I have described a preferred embodiment of my invention but it is clear that numerous changes and omissions could be made without departing from its spirit and in particular where I refer to a part in the description or in the claims by a reference numeral or by a reference letter it is to be understood that I am not limited to the specific embodiment of that part herein illustrated.

I claim:—

1. In combination, a vessel having perforated lugs and a handle provided with ends engaging said lugs and a hook having one of its ends adapted to engage one of said lugs, the other end of said hook being adapted to engage the adjacent end of the said handle.

2. A structure according to claim 1 in which the said vessel, handle and hook are made of resilient material.

3. A structure according to claim 1 in which the end of the said hook which is engaged with said lug is adapted to remain in engagement therewith when the handle is both in the horizontal and in the vertical position, and in which the handle is adapted to depress the end of the hook which is in engagement with the end thereof, when the said handle is revolved from the horizontal to the vertical position.

4. A structure according to claim 1 in which the end of the hook which passes through the lug of the vessel is of a substantially U-shaped contour and the other end of the hook is of a substantially arcuate contour.

5. In combination, the pail 1 having a plurality of nested utensils D therein and having the plates P projecting above it, the said pail 1 having the lugs 2 and 3 engaged by the handle 4 having the hook-like ends 6, and the hook H having the end 8 in engagement with the lug 2, the said hook H having the other end 7 thereof in engagement with the end 6 of the handle 4 adjacent the lug 3.

In testimony whereof I hereunto affix my signature.

ANDREW W. NELSON.